United States Patent Office 3,773,806
Patented Nov. 20, 1973

3,773,806
PROCESS FOR POLYMERIZING UNSATURATED FATTY ACIDS AND THEIR ESTERS
Mamoru Morimoto, Masahiro Saito, and Atsushi Goukon, Wakayama, Japan, assignors to Kao Soap Co., Ltd., Chuo-ku, Tokyo, Japan
No Drawing. Filed May 26, 1971, Ser. No. 147,233
Int. Cl. C08b 9/00
U.S. Cl. 260—407         8 Claims

ABSTRACT OF THE DISCLOSURE

A process for preparing a polymerizate mainly composed of dimer having cyclohexene structure by the thermal polymerization of a conjugated unsaturated fatty acid or its ester, in which an aryl sulfohalide is added to the reaction system as catalyst in order to increase the reaction rate and reduce the content of trimer and higher polymers in the product.

BACKGROUND OF THE INVENTION

Field of the invention

The present invention relates to a process for polymerizing an unsaturated fatty acid containing conjugated unsaturated bonds (usually conjugated double bonds) or its various esters, which comprises carrying out the thermal polymerization of said unsaturated fatty acid or esters thereof in the presence of aryl sulfohalide as catalyst.

Description of the prior art

There have been known two main processes for polymerizing unsaturated fatty acids and their esters: (1) catalytic polymerization by acid catalysts and (2) thermal polymerization usually in the absence of catalyst. Generally, the reaction mechanism essentially differs between the catalytic polymerization and the thermal polymerization. That is to say, polymerization products having a cyclohexene structure can be obtained through Diels-Alder reaction in the thermal polymerization, while, in the catalytic polymerization polymer products having no cyclohexene structure will be produced (for example, refer to "Yukagaku (Oil Chemistry)" vol. 15, pp. 363–366 (1966)).

The physical or chemical properties and the use of the polymer product of said unsaturated fatty acid containing conjugated double bonds greatly depend on the presence of the cyclohexene structure in the polymer. The dependency is particularly significantly in the cases where said polymer is to be used in the manufacture of polyamides, polyesters, etc. The purpose of the present invention is to provide a process for preparing a polymer product having a cyclohexene structure, particularly such polymer rich in the content of dimer, at a high yield.

Although polymerized fatty acid products have various uses, most of them require in practice that the content of trimer in the polymerized fatty acid product be regulated, particularly be lowered. As an example of the main uses of polymerized fatty acids, there is known the manufacture of linear polymers from the polymerized fatty acid and a base such as ethylene diamine In this case, the trimer content in the polymerized fatty acid is required to be as low as possible, because, if the trimer content is too high many crosslinks will be formed due to condensation, which crosslinkings may give a gel that can not be used. Theoretically, it is obvious that the dimer content in the starting polymerized fatty acid must be as high as possible in order to obtain the most excellent linear polymer by reaction with such a base as ethylene diamine.

However, when a conjugated isomer of linoleic acid or its ester is thermally polymerized, the trimer content of the produced polymer will often exceed 30%. Further, a long period of time, e.g. above 20 hours even at 280° C., is required for polymerizing more than 80% of linoleic acid in said conjugated isomer. Fatty acids derived from natural oils, rich in the linoleic acid content, such as safflower oil, soy-bean oil and tall oil, and esters thereof give substantially the same results when they are used instead of linoleic acid or its ester.

SUMMARY OF THE INVENTION

We have made various studies in order to overcome these disadvantages of the conventional methods as mentioned above and have now found that, if a small amount of aryl sulfohalide is used as catalyst in the reaction system when an unsaturated fatty acid containing conjugated unsaturated bonds or its ester is thermally polymerized, the reaction rate of the thermal polymerization will be increased and the content of higher polymer (trimer or greater) in the polymer product will be remarkably reduced. The present invention has been based on this discovery. Thus, the process according to the present invention comprises adding a small amount of ryl sulfohailde to an unsaturated fatty acid containing conjugated unsaturated bonds or its ester and reacting the same at an elevated temperature to polymerize the unsaturated fatty acid or its ester thermally. Such process of the present invention gives a dimer of said fatty acid or its ester at a high yield.

The presence of cyclohexene structure in the polymer product according to the process of the present invention can be proved by isolating the dimer in the polymer product by means of molecular distillation method and then measuring its mass-spectrum and IR-spectrum.

The conjugated unsaturated fatty acids which can be suitably used in the process of this invention include unsaturated fatty acids having 5–22 carbon atoms and containing conjugated double bonds in their molecules, which are, for example, unsaturated fatty acids derived from safflower oil, linseed oil, soy-bean oil, sunflower oil, tall oil, rape seed oil, etc. and containing conjugated double bonds in their molecules. As esters to be suitably used in the present invention, there are lower esters ($C_1$–$C_4$) of the above-mentioned conjugated unsaturated fatty acids. As mentioned above, an aryl sulfohalide should be used in the process of present invention, where the aryl radical should be selected from such aromatic radicals such as benzene, naphthalene, anthracene, etc. Further, said aryl radical can be an aryl radical having an electron-donating substituent such as alkyl radicals of an electron-attracting substitutent such as nitro radical thereon. Illustrative examples of such aryl sulfohalides include benzene sulfochlorides, naphthalene sulfochlorides, anthracene sulfochlorides, toluene sulfochlorides, toluene sulfobromides, chlorbenzene sulfochlorides, nitrobenzene sulfochlorides, etc. The optimum amount of the catalysts to be employed depends on the kinds of the catalyst and the kinds of the unsaturated fatty acid, but it is usually added at a ratio below 1% by weight, preferably at ratio of 0.01–0.2% by weight, based on the weight of the unsaturated fatty acid.

As the reaction conditions, a reaction temperature below 300° C., preferably from 250 to 280° C., can be suitably used in the process. The optimum reaction period depends on the kinds and amount of the catalyst, the reaction temperature and the kinds of the starting material, but it usually ranges from 6 to 14 hours. Although the reaction may be effected in air, it is more desirable to carry out the reaction in the atmosphere of an inert gas such as nitrogen or carbon dioxide in order to prevent the discoloration and oxidation of the product.

The invention will be further described with reference to the Examples.

EXAMPLE 1

To 200 g. of a conjugated methyl ester of safflower fatty acid,[1] there was added 0.1 g. of various kinds of aryl sulfohalides, respectively. Each mixture was heated at 280° C. with the atmosphere of nitrogen. The results are shown in Table 1.

TABLE 1

| Number | Catalyst | Reaction period (hr.) | Yield of polymer product (percent) | Rate of polymerization (percent)[1] | T/(D+T) (percent)[2] | Color (Gardner) |
|---|---|---|---|---|---|---|
| 1-1 | None | 6 | 33.0 | 43.6 | 30.1 | 2 |
| 1-2 | do | 12 | 52.2 | 69.0 | 33.0 | 3 |
| 1-3 | p-Toluene sulfochloride | 6 | 53.6 | 70.9 | 13.4 | 3 |
| 1-4 | do | 12 | 63.4 | 83.9 | 15.8 | 4 |
| 1-5 | p-Chlorobenzene sulfochloride | 12 | 62.6 | 82.8 | 7.0 | 4 |
| 1-6 | p-Nitrobenzene sulfochloride | 12 | 63.8 | 83.7 | 14.3 | 4 |
| 1-7 | α-Naphthalene sulfochloride | 12 | 57.2 | 75.7 | 21.2 | 3 |
| 1-8 | p-Toluene sulfobromide | 12 | 62.1 | 82.1 | 17.1 | 4 |

[1] Rate of polymerization = $\dfrac{\text{Polymer yield (percent)}}{\text{Conjugated diene content (75.6\%)}}$.

[2] D = Amount of dimer; T = Amount of trimer and polymers above trimer.

EXAMPLE 2

The substantially same reaction as in Example 1 is repeated where p-chlorobenzene sulfochloride is employed as catalyst and the amount of catalyst and the reaction temperature are varied. The results are shown in Table 2.

TABLE 2

| No. | Amount of catalyst (g.) | Reaction Temperature (°C.) | Period (hr.) | Polymer yield (percent) | Rate of polymerization (percent) | T/(D+T) (percent) | Color (Gardner) |
|---|---|---|---|---|---|---|---|
| 2-1 | None | 280 | 6 | 33.0 | 43.6 | 30.1 | 2 |
| 2-2 | None | 280 | 12 | 52.2 | 69.0 | 33.0 | 3 |
| 2-3 | None | 270 | 12 | 36.1 | 47.7 | 31.9 | 2 |
| 2-4 | 0.1 | 280 | 12 | 62.6 | 82.8 | 7.0 | 4 |
| 2-5 | 0.2 | 280 | 12 | 64.0 | 84.7 | 7.5 | 5 |
| 2-6 | 0.1 | 270 | 12 | 55.6 | 73.5 | 7.5 | 3 |
| 2-7 | 0.1 | 260 | 18 | 57.3 | 75.8 | 11.7 | 4 |

EXAMPLE 3

To 200 g. of a conjugated soybean oil fatty acid[2] 200 g. there is added 0.1 g. of p-toluene sulfochloride. The mixture is heated at 280° C. in a nitrogen atmosphere. The results are shown in Table 3.

TABLE 3

| Number | Amount of catalyst (g.) | Reaction period (hr.) | Polymer yield (percent) | Rate of polymerization (percent) | T/(D+T) (percent) | Color (Gardner) |
|---|---|---|---|---|---|---|
| 3-1 | None | 3 | 24.0 | 50.0 | 24.8 | 3 |
| 3-2 | None | 12 | 48.9 | 81.7 | 25.8 | 5 |
| 3-3 | 0.1 | 3 | 31.6 | 52.8 | 6.7 | 3 |
| 3-4 | 0.1 | 12 | 49.7 | 83.0 | 10.7 | 5 |

In the above examples, the contents of monomer, dimer, trimer and higher polymers were measured by means of

[1] Fatty acid composition of the starting fatty acid ester (percent by wt.):

| | |
|---|---|
| $C_{16}$ saturated | 6.2 |
| $C_{18}$ saturated | 2.7 |
| $C_{18}$ double bond 1 | 13.7 |
| $C_{18}$ double bond 2, non-conjugated | 1.8 |
| $C_{18}$ double bond 2, conjugated (cis-trans) | 74.3 |
| $C_{18}$ double bond 2, conjugated (trans-trans) | 1.3 |
| Total conjugated diene content | 75.6 |

[2] Fatty acid composition of the starting fatty acid (percent by wt.):

| | |
|---|---|
| $C_{16}$ saturated | 13.2 |
| $C_{18}$ saturated | 3.9 |
| $C_{18}$ double bond 1 | 22.0 |
| $C_{18}$ double bond 2, non-conjugated | 1.0 |
| $C_{18}$ double bond 2, conjugated (cis-trans) | 52.8 |
| $C_{18}$ double bond 2, conjugated (trans-trans) | 2.8 |
| $C_{18}$ double bond 3 | 4.3 |
| Total content of conjugated dienes | 59.9 | a modified method of the gas-chromatographic determination proposed by R. A. L. Paylor et al. (Anal. Chem., vol. 40, p. 1358 (1968)).

The embodiments of the invention in which an exclusive property or privilege is claimed are defined as follows:

1. A process for preparing a polymer product mainly composed of dimer having cyclohexene structure, which comprises thermally polymerizing unsaturated fatty acid containing conjugated unsaturated bonds or ester thereof, at a temperature in the range of from 250 to 300° C., for a period of from 6 to 14 hours, in the presence of from 0.01 to 1% by weight, based on the weight of the unsaturated fatty acid or ester thereof, of aryl sulfohalide as catalyst, the aryl radical of said aryl sulfohalide being derived from benzene, naphthalene, anthracene, or substituted benzene, naphthalene or anthracene having an electron-donating substituent or an electron-attracting substituent thereon.

2. The process as claimed in claim 1, in which said unsaturated fatty acid is conjugated unsaturated fatty acid having 5 to 22 carbon atoms and said ester is the ester of a lower alcohol having 1–4 carbon atoms.

3. The process as claimed in claim 2, in which said conjugated unsaturated fatty acid is selected from conjugated unsaturated fatty acids derived from safflower oil, linseed oil, soy-bean oil, suflower oil, tall oil and rape seed oil.

4. The process as claimed in claim 1, in which said aryl sulfohalide is selected from the group consisting of benzene sulfochlorides, naphthalene sulfochlorides, anthracene sulfochlorides, toluene sulfochlorides, toluene sulfobromides, chlorobenzene sulfochlorides and nitrobenzene sulfochlorides.

5. The process as claimed in claim 1, in which the amount of aryl sulfohalide is 0.01–0.2% by weight based on the weight of said unsaturated fatty acid.

6. The process as claimed in claim 1, in which the polymerization reaction is conducted at a temperature in the range from 250 to 280° C.

7. The process as claimed in claim 1, in which the polymerization reaction is conducted in the atmosphere of an inert gas.

8. The process as claimed in claim 7, in which said inert gas is nitrogen or carbon dioxide.

References Cited

Sims: The Journal of the American Oil Chemists Society, vol. 32, February 1955, pp. 94 to 98.

Suzumara et al.: Chem. Abst., vol. 65 (1966), 5397c.

LEWIS GOTTS, Primary Examiner

C. L. MILLS, Assistant Examiner

UNITED STATES PATENT OFFICE
CERTIFICATE OF CORRECTION

Patent No. 3,773,806  Dated November 20, 1973

Inventor(s) Mamoru Morimoto, Masahiro Saito and Atsushi Goukon

It is certified that error appears in the above-identified patent and that said Letters Patent are hereby corrected as shown below:

In the heading, note priority data as follows:

Japan       Serial No. 48201/70       filed June 4, 1970

Signed and sealed this 17th day of September 1974.

(SEAL)
Attest:

McCOY M. GIBSON JR.  
Attesting Officer

C. MARSHALL DANN  
Commissioner of Patents